(12) United States Patent
Baird et al.

(10) Patent No.: US 8,432,809 B2
(45) Date of Patent: Apr. 30, 2013

(54) METHOD FOR COMMUNICATION BETWEEN PROCESSORS

(75) Inventors: Brian Baird, Pleasanton, CA (US); Daniel Talayco, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 532 days.

(21) Appl. No.: 11/200,007

(22) Filed: Aug. 10, 2005

(65) Prior Publication Data

US 2006/0245375 A1 Nov. 2, 2006

Related U.S. Application Data

(60) Provisional application No. 60/675,104, filed on Apr. 27, 2005.

(51) Int. Cl.
*H04L 12/26* (2006.01)

(52) U.S. Cl.
USPC .......................................................... 370/236

(58) Field of Classification Search .................. 370/229, 370/235, 236, 254–255, 257–258, 351, 389, 370/392, 400, 410, 422, 427, 901–902, 908–909, 370/912
See application file for complete search history.

(56) References Cited

U.S. PATENT DOCUMENTS

| | | | |
|---|---|---|---|
| 4,507,777 A * | 3/1985 | Tucker et al. ................ | 370/258 |
| 5,319,644 A * | 6/1994 | Liang .......................... | 370/452 |
| 5,583,996 A * | 12/1996 | Tsuchiya ..................... | 709/218 |
| 5,825,772 A | 10/1998 | Dobbins et al. | |
| 6,104,696 A | 8/2000 | Kadambi et al. | |
| 6,487,606 B1 * | 11/2002 | Minyard et al. ............... | 709/251 |
| 6,813,268 B1 * | 11/2004 | Kalkunte et al. .............. | 370/392 |
| 7,191,271 B2 * | 3/2007 | Andre .......................... | 710/119 |
| 7,733,789 B1 * | 6/2010 | Nederveen et al. ........... | 370/250 |
| 2002/0080782 A1 * | 6/2002 | Dick et al. .................... | 370/362 |
| 2002/0172203 A1 * | 11/2002 | Ji et al. ......................... | 370/392 |
| 2004/0071142 A1 * | 4/2004 | Moriwaki et al. ............ | 370/392 |
| 2004/0081166 A1 * | 4/2004 | Stanforth et al. ........ | 370/395.32 |
| 2004/0170184 A1 * | 9/2004 | Hashimoto ................... | 370/401 |
| 2004/0190460 A1 * | 9/2004 | Gaskill ........................ | 370/254 |
| 2005/0047350 A1 * | 3/2005 | Kantor et al. ................ | 370/254 |
| 2005/0190699 A1 * | 9/2005 | Smith et al. .................. | 370/241 |
| 2006/0056412 A1 * | 3/2006 | Page ............................ | 370/392 |
| 2006/0168320 A1 * | 7/2006 | Kidd et al. ................... | 709/238 |

OTHER PUBLICATIONS http://www.thefreedictionary.com/network, Definition of the word "network", accessed Aug. 5, 2011, published 2011 by Farlex, Inc. (website), published 2000 by Houghton Mifflin Company, Fourth Edition, all pages.*

* cited by examiner

*Primary Examiner* — Omar Ghowrwal (57) ABSTRACT

The invention provides a method and system for communication between processors. Rather than provide an external network connection solely for providing a communication link between CPUs, the present invention utilizes the network devices to transfer information between CPUs. A transmitting network device marks a control packet, which is intended as a communication between CPUs, as control traffic. The receiving network device will determine whether the received control packet is intended for its own CPU and provide the control packet to its CPU if that is the case.

17 Claims, 7 Drawing Sheets

METHOD FOR COMMUNICATION BETWEEN PROCESSORS

REFERENCE TO RELATED APPLICATIONS

This application claims priority of U.S. Provisional Patent Application Ser. No. 60/675,104 filed on Apr. 27, 2005. The content of this provisional application is hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a method and apparatus for communication between the processors of network devices.

2. Description of the Related Art

Computer networks are commonly used to send and receive data, to share resources, and to provide communication between remote users. As computer performance has increased in recent years, the demands on computer networks have also significantly increased; faster computer processors and higher memory capabilities require networks with high bandwidth capabilities to enable high speed transfer of significant amounts of data. Based upon the Open Systems Interconnect (OSI) 7-layer reference model, network capabilities have grown through the development of devices such as repeaters, bridges, routers, and switches, which operate with various types of communication media. Thickwire, thinwire, twisted pair, and optical fiber are examples of media which has been used for computer networks. The devices may be interconnected by a high speed local data link such as a local area network (LAN), token ring, ethernet, etc.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular medium.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network. The spanning tree algorithm defines a protocol for preventing data loops. Layer three switches, sometimes referred to as routers, can forward packets based upon the destination network address. Layer three switches are capable of learning addresses, maintaining tables thereof which correspond to port mappings, and changing packet data in the process. Processing speed for layer three switches can be improved by utilizing specialized high performance hardware, and off loading the host CPU so that instruction decisions do not delay packet forwarding.

Today's network devices require high port density, centralized management, redundancy, modularity and numerous other features. Providing such features requires a flexible, distributed approach, coordinating multiple CPU's which support components that may be added or removed dynamically.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention provides, in one embodiment, a system of interconnected network devices. The system may include two or more network devices connected to build a larger system which behaves as a single logical entity. The network devices convey data across dedicated connections referred to as "stack ports." This configuration will be referred to as a "stack" of network devices, although the physical organization may be a chassis or be highly dispersed. The stack of network devices acts as a single logical network switch with a larger load capacity. Connecting the network devices in a stacked configuration results in the need for discovering what the components of the system are and whether they can communicate with each other. The system should be configured in a manner which allows each of the individual components to communicate with the other components. Therefore, the present invention provides a method and apparatus for dynamic discovery and configuration of network devices in a stacked arrangement.

The network devices of the present invention may be network components with switching and computational capabilities. Additionally, the network devices may be network hardware components capable of generating, receiving and processing packets as will be discussed below. The network devices may have switching and/or routing capabilities appropriate to a local area network (LAN) or other communication network. Furthermore, each of the network devices may include a CPU or CPU functionality, or, alternatively, may be in communication with an external CPU via a CPU interface.

Figure 6:
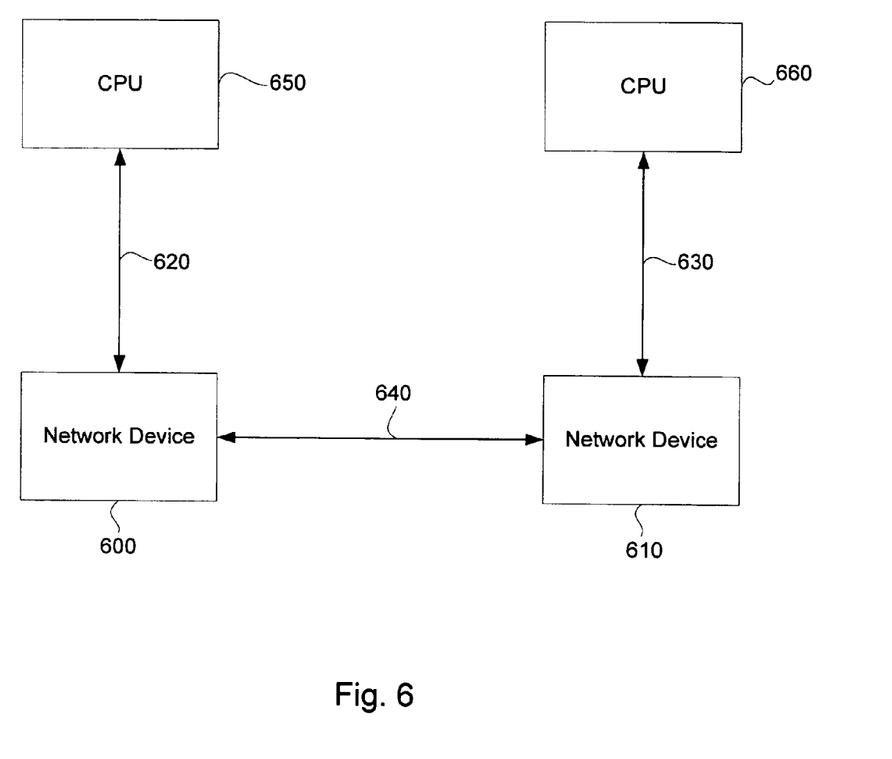
FIG. 6 illustrates a system according to another embodiment of the invention.

The present invention further provides, in one embodiment, a system of stacked or connected network devices whereby the CPUs of the network devices may communicate with each other without the need for a dedicated network connection. FIG. 6 illustrates a system of the present invention according to this embodiment. A network device 600 is connected to another network device 610 via a link 640. The link 640 is generally provided in order to transfer data packets between network devices. The link 640 may be a port such as a stack port. Although only two network devices are illustrated, any number of network devices may be provided and connected in a similar configuration according to the present invention. Each of the network devices 600, 610 is also in communication with at least one central processing unit (CPU) 650, 660 via links 620, 630.

Traditionally, when the CPUs 650, 660 needed to communicate with each other, they would do so via a separate, dedicated network connection which directly connected the CPUs and was utilized solely for control traffic. The communication between the CPUs may, for example, comprise sending and receiving control packets which may specify the configuration information of the system. The control packets may be probe packets, routing packets, configuration packets, and topology packets as will be discussed below. According to an embodiment of the present invention, however, a separate network connection between CPUs for carrying control traffic and allowing the CPUs to communicate is not necessary. Instead, according to one embodiment of the current invention, the link 640 is utilized to transfer control traffic, in addition to the data traffic.

In order for the link 640 to be able to handle both data traffic and control traffic, a logical separation between the control traffic and data traffic should be maintained. As such, the present invention provides the ability to mark a packet as a control packet. More specifically, prior to transmitting a control packet, the transmitting network device 600 will determine whether the packet it is sending is control traffic or data traffic. Based on this determination, the transmitting network device 600 will mark the packet as control traffic or data traffic accordingly. This ensures that any packet which is marked as control traffic will travel to the next CPU.

Therefore, the control traffic is treated independently of the data traffic. Additionally, according to one embodiment of the invention, the data traffic may be disallowed or prohibited from transmission during the time that control traffic is being transmitted between CPUs via the link 640. For example, upon start-up of the system, the CPUs 650, 660 may need to communicate configuration information between one another in order to correctly configure the system. During this time, data traffic may be precluded from traveling between network devices and only control traffic will utilize the link 640.

Upon start-up of the system, each of the network devices 600, 610 is configured such that they are able to locate and communicate with an adjacent network device. This capability is referred to as "next hop." "Next hop" includes the capability of the network device 600 to automatically recognize and communicate with adjacent network devices. Thus, when the CPU 650 of a network device 600 wants to send a control packet to the next CPU 660, the network device 600 marks the control packet as control traffic and is able to forward the control packet to the adjacent network device 610. Further, the receiving network device 610 can send the control packet on to any further adjacent network devices as required. In this manner, the control packet will be forwarded until it reaches the intended CPU. Thus, the present invention provides the ability to send or address a control packet to an arbitrary CPU in the system.

Figure 7:
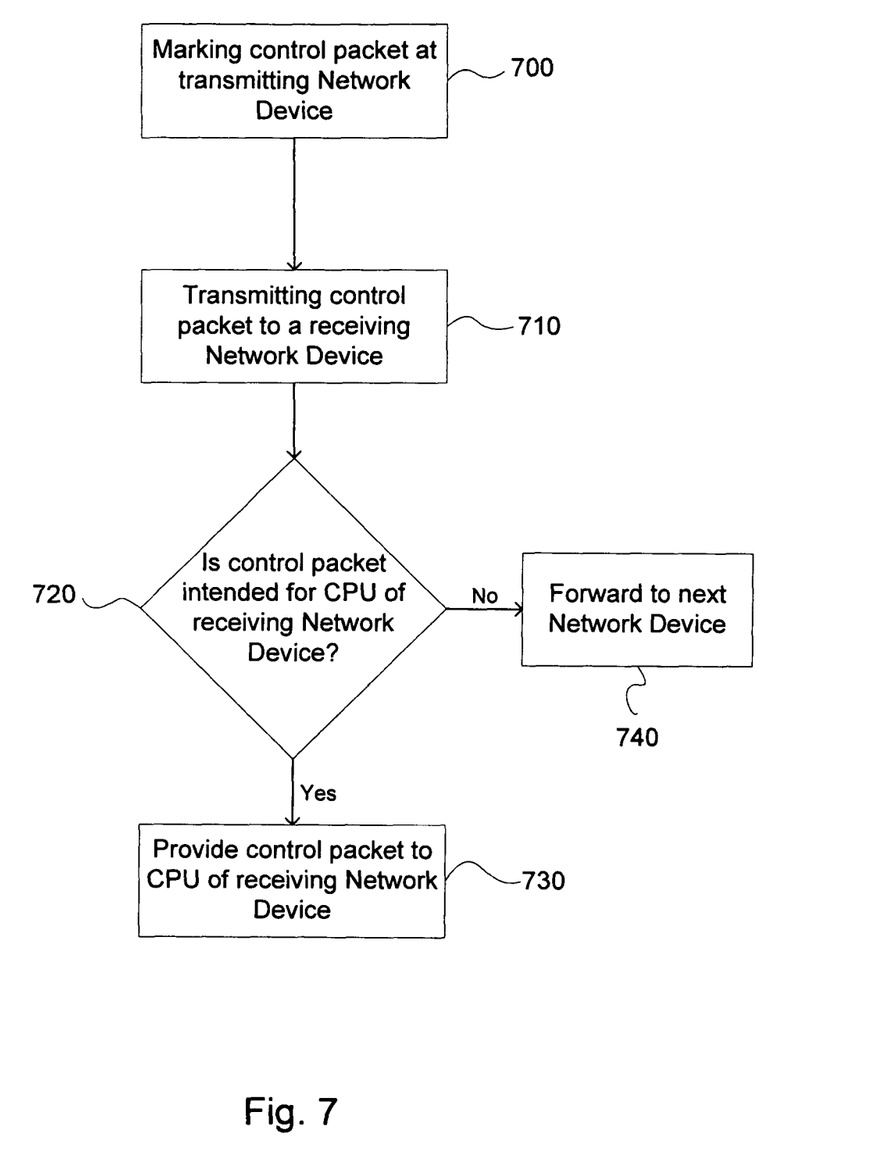
FIG. 7 illustrates a method according to another embodiment of the invention.

FIG. 7 illustrates a method according to another embodiment of the invention. The method includes the steps of marking a control packet at a transmitting network device 700 and sending the control packet to a next network device 710 based on the "next hop" capability. The method further includes the steps of determining, at the receiving network device, whether the control packet is destined for the CPU of the receiving network device 720. The control packet is provided to the CPU of the receiving network device when the control packet is intended for that CPU 730. The method may further include the step of forwarding the control packet to another, adjacent network device in the system until the packet reaches the CPU for which it was intended 740. The step of marking the control packet allows the network device to identify the packet as control traffic that is intended for a CPU.

Consequently, the present invention provides, in part, a method and system whereby the need for a separate network connection for transmitting control traffic between CPUs of a network device is eliminated. The invention is able to utilize the existing links between the network devices to transmit both data traffic and control traffic that is destined for CPUs of other network devices in the system. In addition, control traffic or data traffic may be forwarded to any network device in the system even though the network devices need only to be able to communicate with adjacent network devices via the "next hop" capability, as discussed above.

Figure 1:
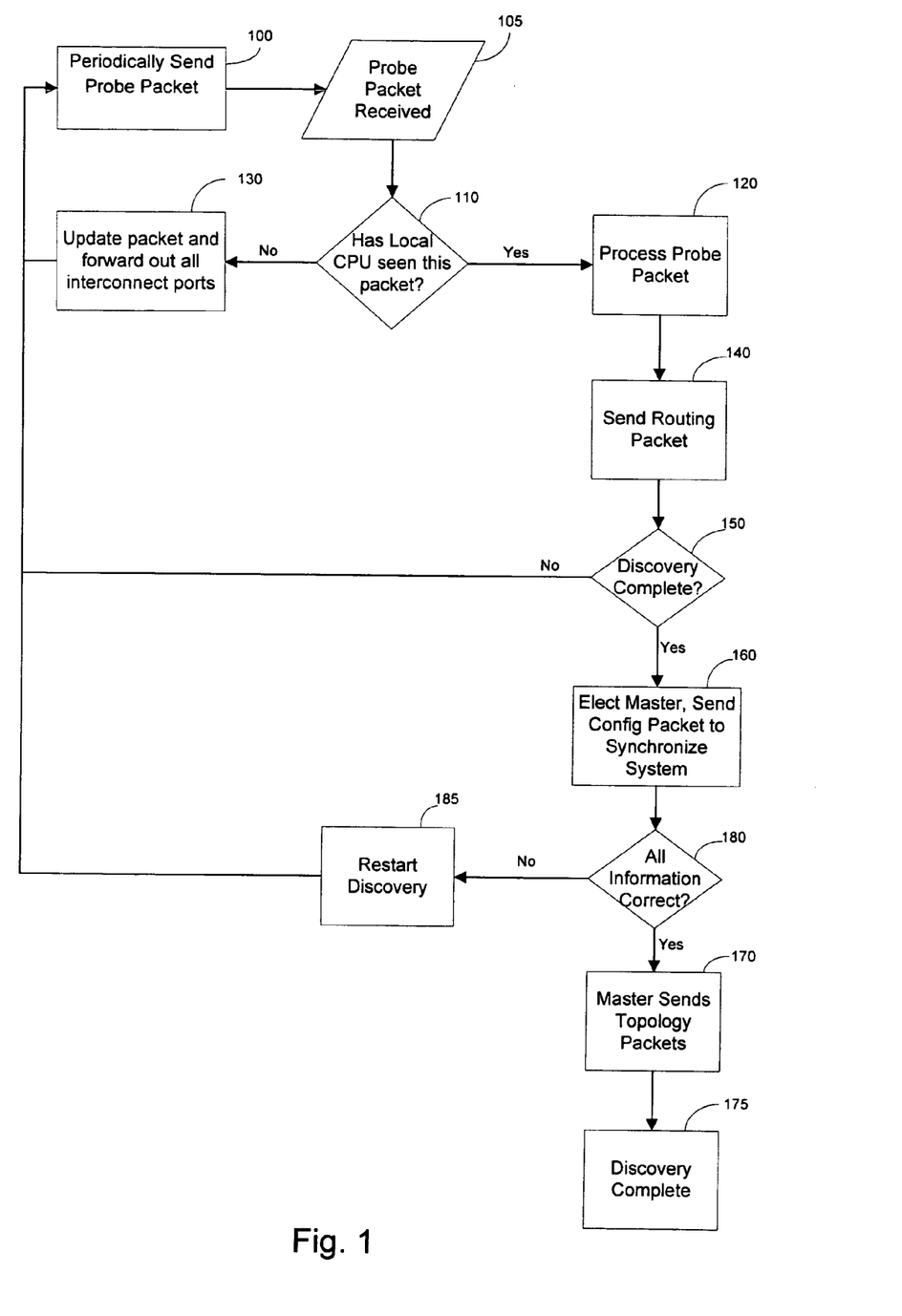
FIG. 1 illustrates a method according to one embodiment of the invention.

Furthermore, based on the method and system for transmitting control traffic as discussed above, the present invention also provides, in one embodiment, a method and system for the dynamic discovery of the configuration of the stack of network devices. FIG. 1 illustrates a method according to this embodiment of the invention. Probe packets, which may be an example of control traffic, are marked and forwarded from a network switch to other network switches in the stack 100 via a stack port. The probe packets include at least a tag indicating the transmit port from which the probe packet was sent and the receive port at which the probe packet was received. The data portion of a probe packet may contain a list of entries with the following information: the identifying key of the CPU at this link (key), the index of the stack port on which the packet was received (rx_idx), and the index of the stack port on which the packet was transmitted (tx_idx).

A CPU in each network switch in the stack creates and updates a local database which maintains the information received from each packet which the CPU analyzes. Upon receiving a packet 105, the receiving CPU makes an entry for the sending key in its local database if one does not already exist. It then updates the receive information for the stack port on which the packet was received. The CPU of the receiving switch will then determine whether the switch has previously seen this specific packet 110. If it has (the CPU's own key appears on the list), then the CPU will analyze the data contained in the packet and update its local database accordingly 120. If it has not seen the packet previously, the CPU adds its own information to the end of the list, includes the new tagging information in the probe packet (i.e. transmit and receive ports), and sends the probe packet out all stack ports including the source port of the original packet 130.

Figure 3:
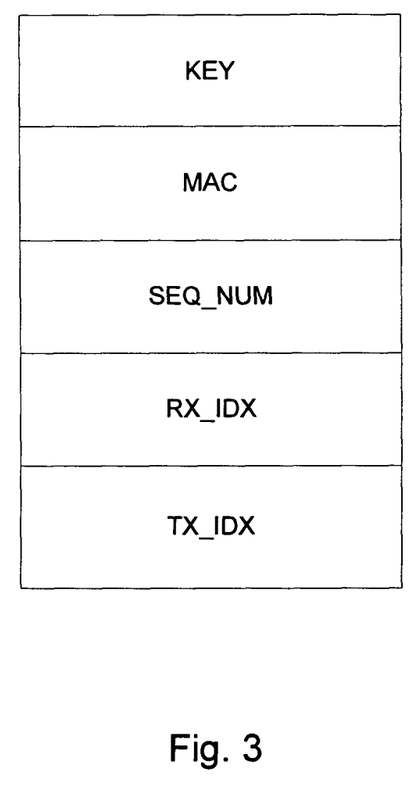
FIG. 3 illustrates a format of probe packet entries according to one embodiment of the invention.

FIG. 3 illustrates a format of the probe packet entries according to one embodiment of the invention. Specifically, the probe packet entry format may be as follows:

KEY—The unique key identifying the CPU;

MAC—The MAC address for this CPU;

SEQ_NUM—Discovery sequence number which is assigned on discovery start;

RX_IDX—Index of stack port on which this packet was received;

TX_IDX—Index of stack port on which this packet was transmitted.

Next, routing packets are sent from one switch to its neighboring switch 140. Routing packets, as mentioned above, may be one example of control traffic which is marked and forwarded to an adjacent network switch. The routing packets contain all of the information in the local database of the switch that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

Figure 4:
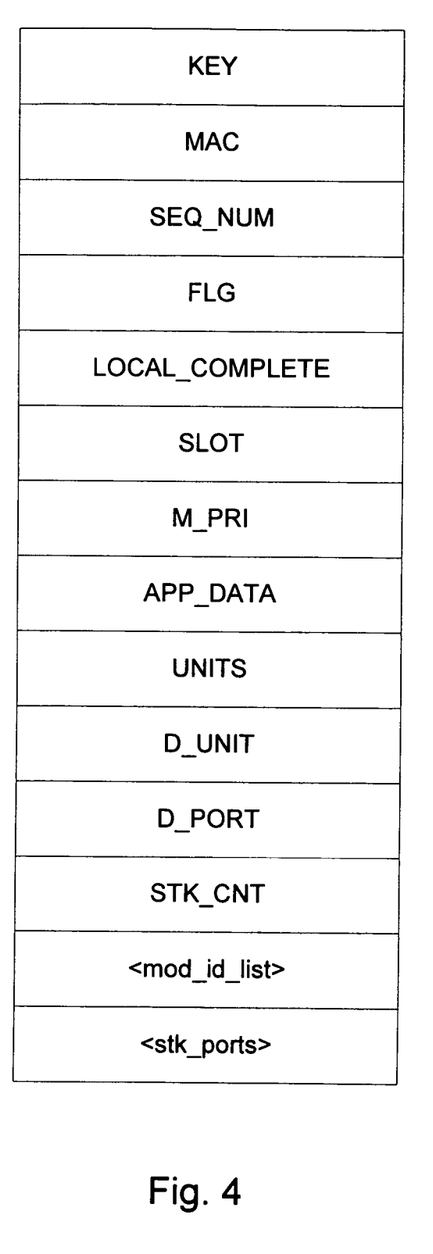
FIG. 4 illustrates a format of routing packet entries according to one embodiment of the invention

FIG. 4 illustrates a format of the routing packet entries according to an embodiment of the invention. The routing packet may include the following entries:

KEY—The unique key identifying the CPU;
MAC—This entry's MAC address;
SEQ_NUM—Discovery sequence number;
FLG—Flags;
LOCAL_COMPLETE—KEY knows it has a complete database;
SLOT—Slot ID;
M_PRI—Master priority;
APP_DATA—Application data;
UNITS—Number of switch devices controlled by this CPU;
D_UNIT—0-based local index of device for addressing CPU;
D_PORT—Destination port for addressing this CPU;
STK_CNT—How many stack port entries follow;
<stk_ports>—One entry per stack port.

The method further includes determining whether all of the configuration information is known to all switches in the stack 150. Each local database includes a first indicator for indicating that the local CPU has resolved the local stack port information. A second indicator is also included in each local database for indicating that the local CPU has confirmed that all other CPUs have resolved their local information. A third indicator is also provided in each local database for indicating that the local CPU has confirmed that every other CPU has also confirmed that the other CPUs have resolved their local information. If all of these indicators are positive, each switch has determined that all of the configuration information has been received and resolved by all of the other switches in the stack.

Next, one of the network switches is elected as a central authority, called a master 160. A master priority entry may be included in each database. The master may be elected by comparing the master priority entries of each switch. The switch which has the highest master priority entry will be selected as master. If more than one switch has the highest priority, then the local CPU with the lowest identifier is designated as the master. Configuration packets, containing the key of the master CPU, are sent by the master to each other network device in the system. These configuration packets are yet another example of control traffic that may be communicated between CPU's.

The master undertakes the analysis of the configuration information in the database. During the analysis, the master will determine how to avoid loops in the system, and will generate a map or path for every possible pair of connections. The master may undertake the analysis through, for example, graph analysis, loop detection, or path determination. The master will then send the result of the analysis, in topology packets, to all the other network switches in the stack 170. A topology packet is also looped back from the master to itself to allow local programming of devices on the master. The topology packet contains the final configuration information that all of the switches have resolved to use, and also signals the completion of the discovery process 175. The topology packet may also be an example of control traffic.

Figure 5:
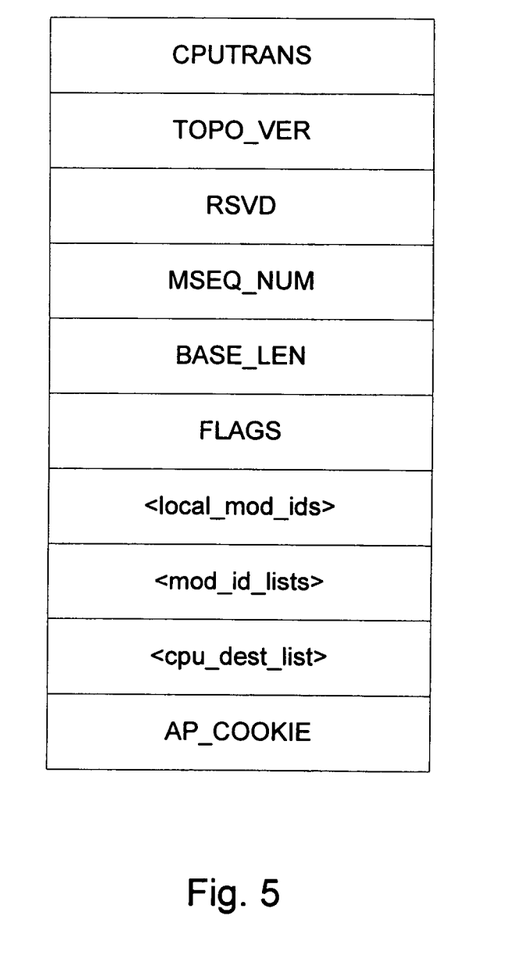
FIG. 5 illustrates a format of topology packet entries according to one embodiment of the invention.

FIG. 5 illustrates a format of the topology packet entries according to an embodiment of the invention. The topology packet may include the following entries:

CPUTRANS—Transport header;
TOPO_VER—Topology version number;
RSVD_Reserved byte;
MSEQ_NUM—Sequence number of discovery used by master;
BASE_LEN—Length in bytes of the packet from NUM_STK through AP_COOKIE. This is used for the comparison of topology packets;
FLAGS—flags;
<local-mod-ids>—List of base module IDs to use;
<mod-id-lists>—List of module IDs bound to each stack port;
<cpu-dest-list>—The destination mod ids to use per CPU;
AP_COOKIE—Cookie used by application. By default, it is used in detecting topology changes.

The system is synchronized such that all switches in the stack agree that the process is complete 180. Validation is made that the configuration information exchanged is the same across all of the switches. If any discrepancy is detected in any of the databases, a fault is triggered and the process is repeated 185. Additionally, every local database has a discovery sequence number. The sequence number is incremented whenever the CPU has detected a problem. Anytime a problem is detected, the CPU will re-start the process from the beginning. As discussed above, since the local database information is propagated throughout the system, all of the other network switches will also see that there is a problem and reset the process.

Thus, the method described above provides a way for dynamically determining or discovering the interconnections between a system of network switches. The information discovered during this process may include the following: (1) determining the number of CPUs in the system, each identified by a unique MAC address; (2) information about each CPU in the system, including the unique database key identifying the CPU, the number of switch devices controlled by the CPU, the total number of stack ports controlled by the CPU, the total number of module IDs required by all switch devices controlled by the CPU; (3) determining routes to each CPU in the system, including what port in a network device should a packet exit in order to reach a given CPU; (4) generating a map indicating the network device each stack port connects to, for transmit and receive independently; (5) determining the master network device; (6) locally significant CPU references; (7) locally significant device numbers for each switch device in the system; (8) global module ID numbers for each device that requires one; (9) determining the ports that need to be disabled in order to prevent loops from occurring in the system.

Figure 2:
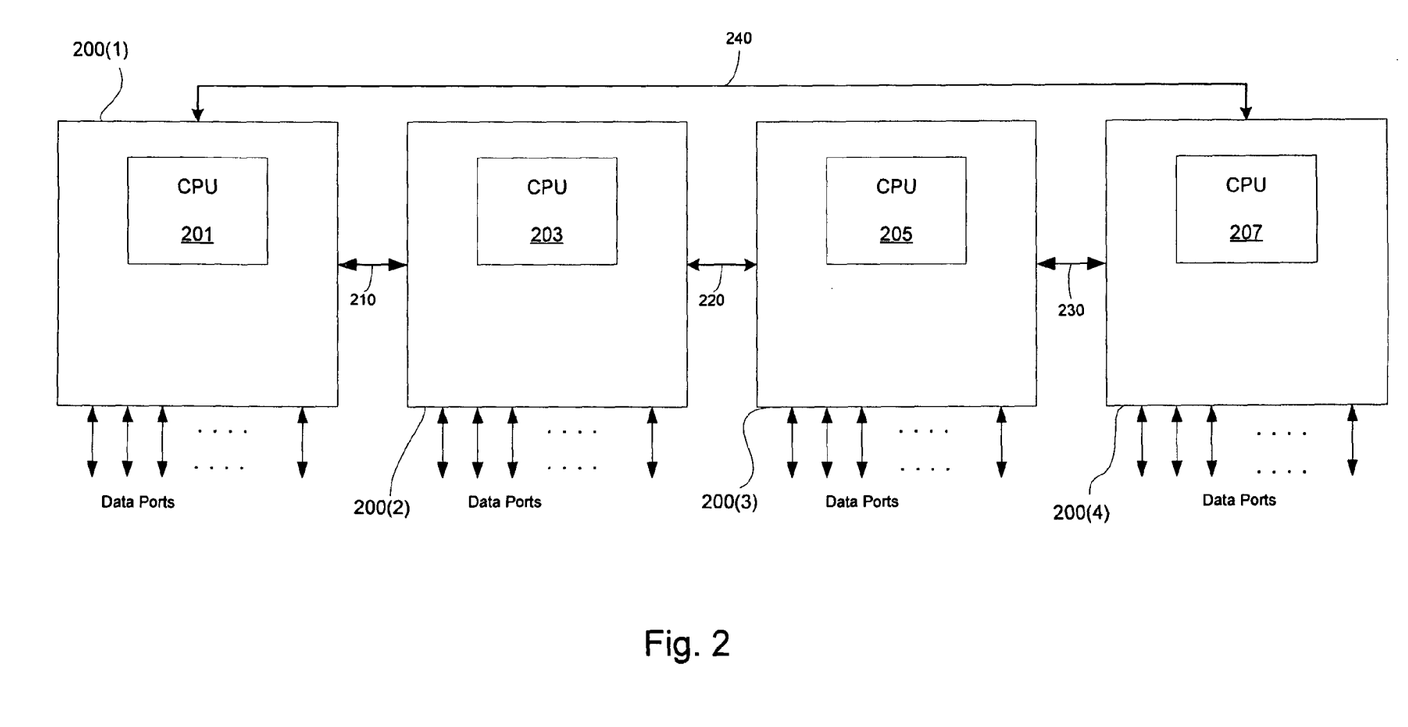
FIG. 2 illustrates a system according to one embodiment of the invention

FIG. 2 illustrates a system according to an embodiment of the present invention. The system includes a stack of network devices 200(1), 200(2), 200(3), 200(4). Four network devices are illustrated, however any number of network devices may be stacked in this configuration. Upon start-up, the system is configured in a manner that guarantees that information can travel from each network device to one of the adjacent or neighboring network devices, or "next hop." The network devices 200(1), 200(2), 200(3), 200(4) are connected to each other via stack ports 210, 220, 230, 240. Each of the network devices 200(1), 200(2), 200(3), 200(4) may include CPUs 201, 203, 205, 207. In addition to the stack ports 210, 220, 230, 240, the network device may include a plurality of data ports for transmitting and receiving data packets.

Upon start-up of the system, each of the network devices 200(1), 200(2), 200(3), 200(4) sends out a probe packet via the stack ports 210, 220, 230, 240 to the adjacent network devices. The probe packet contains a tag indicating the transmit and receive ports used by the probe packet. The CPU of a network device receiving a probe packet will determine whether it has previously seen the particular probe packet. If it has, then it will analyze the information contained in the packet and update a local database, maintained by each CPU, with the information extracted from the probe packet. If the CPU has not previously seen the packet, then it will update the tag of the probe packet and send it on to the next network device. Therefore, the tag of a probe packet according to an embodiment of the present invention may, for example, look like the following: $CPU_1, Tx_1, CPU_2, Rx_2, Tx_3, \ldots, CPU_i, Rx_y, Tx_z$. According to this example, the probe packet was sent from $CPU_1$ on transmit port 1, received by $CPU_2$ on receive port 2, transmitted by $CPU_2$ on transmit port 3, received by $CPU_i$ on receive port y, and transmitted by $CPU_i$ on transmit port z.

Each of the network devices 200(1), 200(2), 200(3), 200(4) will then send out a routing packet via the stack ports 210, 220, 230, 240. The routing packets contain all of the information in the local database of the CPU of the network device that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

One of the network devices in the system can be selected as a master network device. As discussed above, the master network device may be selected by comparing master priority entries in the databases or by comparing identifiers. Configuration packets, containing the key of the master CPU, are sent by the master to each other network device in the system.

The master network device analyzes the configuration information in its local database. As mentioned above, the master is responsible for determining how to avoid loops in the system, and will also generate a map or path for every possible pair of connections. The master network device will then send the result of the analysis, in topology packets, to all the other network switches in the stack. The topology packet contains the final configuration information that all of the switches have resolved to use, and also signals the completion of the discovery process.

Thus, in the manner described, the system of network devices is able to dynamically discover what the components of the system are and how they are interconnected. Furthermore, the present invention provides the ability for both control traffic and data traffic to travel between adjacent network devices via a single connection or link, eliminating the need for a dedicated link that carries only control traffic.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for communicating between processors of at least two network devices connected within a network, the method comprising:
    receiving a control packet marked as control traffic by a transmitting network device according to a next-hop addressing scheme, over a network connection from a transmitting data port of the transmitting network device to a receiving data port of a next network device, wherein the transmitting data port and the receiving data port include hardware ports operable to connect the network device and the next network device, the control packet being one of a plurality of control packets used to discover and configure the network device and the next network device as at least part of a logical network switch;
    identifying the control packet as control traffic at the next network device, based on the marking;
    determining, at the next network device, whether the control packet is destined for a central processing unit (CPU) of the next network device;
    providing the control packet to the CPU of the next network device when it is determined that the control packet is destined for the CPU of the next network device;
    updating a local database of the CPU of the next network device using the control packet, to thereby reflect updating of the next-hop addressing scheme; and
    forwarding the control packet to an adjacent network device according to the next-hop addressing scheme.

2. The method of claim 1, further comprising:
    stopping receipt of a flow of data traffic while the control packet is traveling from the transmitting network device to the next network device.

3. The method of claim 1, wherein the control packet includes at least one of a probe packet, a topology packet, a routing packet, and a configuration packet.

4. The method of claim 1, wherein forwarding the control packet to the adjacent network device according to the next-hop addressing scheme comprises:
    discovering a connection of the adjacent network device to the next network device; and
    forwarding the control packet to the adjacent network device as an adjacent device to the next network device according to the next-hop addressing scheme.

5. The method of claim 1, wherein the network device and the next network device are part of a stack of network devices configured to act as the logical network switch within the network and the transmitting data port and the receiving data port include stack ports.

6. The method of claim 1, wherein the at least two network devices, including the network device and the next network device, are each nodes of a local area network.

7. The method of claim 1, wherein the network device and the next network device both include network switching devices configured to route network traffic through the network, including through the network connection.

8. The method of claim 7, wherein the network device and the next network device are stacked to form an aggregated network switching device.

9. A network device included within a network of devices, the network device comprising:
    at least one central processing unit (CPU) interface for communicating with a CPU; and
    at least one stack port connecting the network device to at least one other network device via a network connection and according to a next-hop addressing scheme, thereby forming a stack of network devices configured to act as a logical network switch within the network of devices; wherein the network device is configured to mark a control packet received from the CPU and transmit the control packet to a receiving network device using the at least one stack port and via the network connection in accordance with the next-hop addressing scheme, the control packet being one of a plurality of control packets used to discover and configure the at least one other network device as part of the logical network switch.

10. The network device of claim 9, wherein marking the control packet allows the network device to identify the control packet as control traffic.

11. The network device of claim 9, wherein the network device is configured to receive a second control packet from a previous network device of the stack of network devices, according to the next-hop addressing scheme, and determine whether the second control packet is destined for the CPU, and provides the second control packet to the CPU when it is determined that the second control packet is destined for the CPU.

12. The network device of claim 9, wherein the control packet comprises at least one of a probe packet, a topology packet, a routing packet, and a configuration packet.

13. The network device of claim 9, wherein the network device is configured to discover the next network device at an adjacent position within the network to the network device, according to the next-hop addressing scheme.

14. The network device of claim 9 wherein the network device and the at least one other network device are each nodes of a local area network.

15. The network device of claim 9 wherein the network device and the at least one other network device both include network switching devices configured to route network traffic through the network, including through the network connection.

16. A stack of network devices, comprising:

marking means for marking a control packet as control traffic;

transmitting means for transmitting the control packet to a next network device of the stack of network devices, wherein the stack of network devices is configured to act as a logical network switch within the network of devices, the control packet being one of a plurality of control packets used to discover and configure the stack of network devices as the logical network switch;

determining means for determining, at the next network device, whether the control packet is destined for a central processing unit (CPU) of the next network device;

providing means for providing the control packet to the CPU of the next network device when it is determined that the control packet is destined for the CPU of the next network device; and updating means for updating a local database of the CPU of the next network device using the control packet, to thereby reflect updating of a next-hop addressing scheme, wherein the marking means allows the network device to identify the control packet as control traffic.

17. The stack of network devices of claim 16, wherein the transmitting means is configured to transmit the control packet to the next network device according to the next-hop addressing scheme.

* * * * *